United States Patent
Milburn, Jr.

(10) Patent No.: US 9,099,004 B2
(45) Date of Patent: Aug. 4, 2015

(54) OBJECT DIFFERENTIATION WARNING SYSTEM

(71) Applicant: Robert Bosch GmbH, Stuttgart (DE)

(72) Inventor: Ken Milburn, Jr., Wolverine Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/024,852

(22) Filed: Sep. 12, 2013

(65) Prior Publication Data

US 2015/0070156 A1 Mar. 12, 2015

(51) Int. Cl.
- *B60Q 1/00* (2006.01)
- *G08G 1/16* (2006.01)
- *B60Q 9/00* (2006.01)

(52) U.S. Cl.
CPC ............... *G08G 1/165* (2013.01); *B60Q 9/008* (2013.01)

(58) Field of Classification Search
CPC ................ G08G 1/165; B60Q 9/008
USPC ............... 340/435; 348/148; 701/70
See application file for complete search history.

(56) References Cited

U.S. PATENT DOCUMENTS

| | | | |
|---|---|---|---|
| 6,169,572 B1 | 1/2001 | Sogawa | |
| 6,832,156 B2 | 12/2004 | Farmer | |
| 7,633,383 B2 | 12/2009 | Dunsmoir et al. | |
| 8,054,201 B2 | 11/2011 | Okugi et al. | |
| 2003/0108212 A1 | 6/2003 | Yun | |
| 2012/0056734 A1* | 3/2012 | Ikeda et al. | 340/425.5 |
| 2012/0140072 A1 | 6/2012 | Murashita et al. | |

* cited by examiner

*Primary Examiner* — Thomas Mullen
(74) *Attorney, Agent, or Firm* — Michael Best & Friedrich LLP

(57) ABSTRACT

A vehicle object warning system and method that differentiates between expected and unexpected objects. A sensor detects a set of objects external to the vehicle upon the occurrence of different triggering conditions. A controller determines locations of the sets of objects detected by the sensor. Further, the controller can store the locations of a set of objects in a memory as well as determine if the location of an object is not stored in the memory. An alarm provides a different type of warning if the controller determines that the location of an object is not stored in the memory.

20 Claims, 4 Drawing Sheets

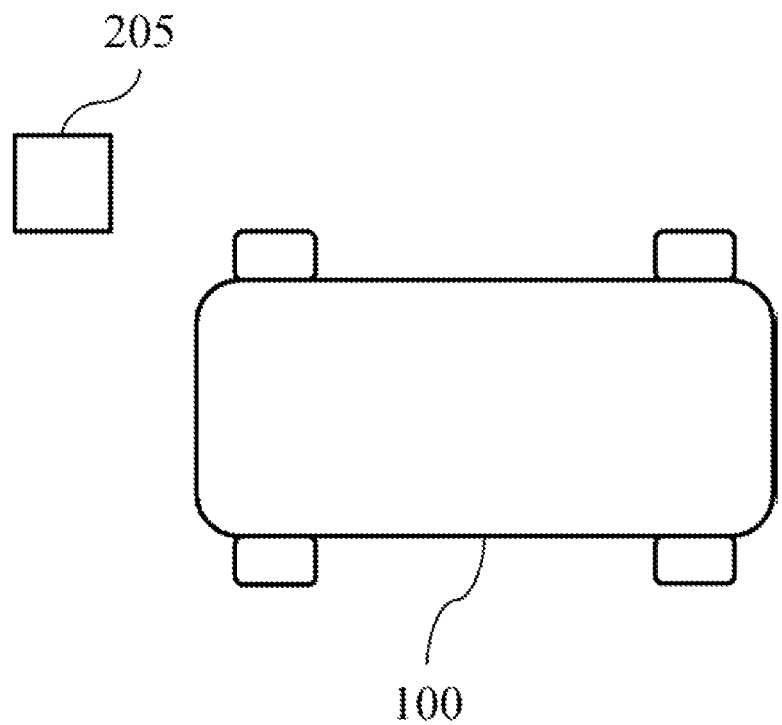

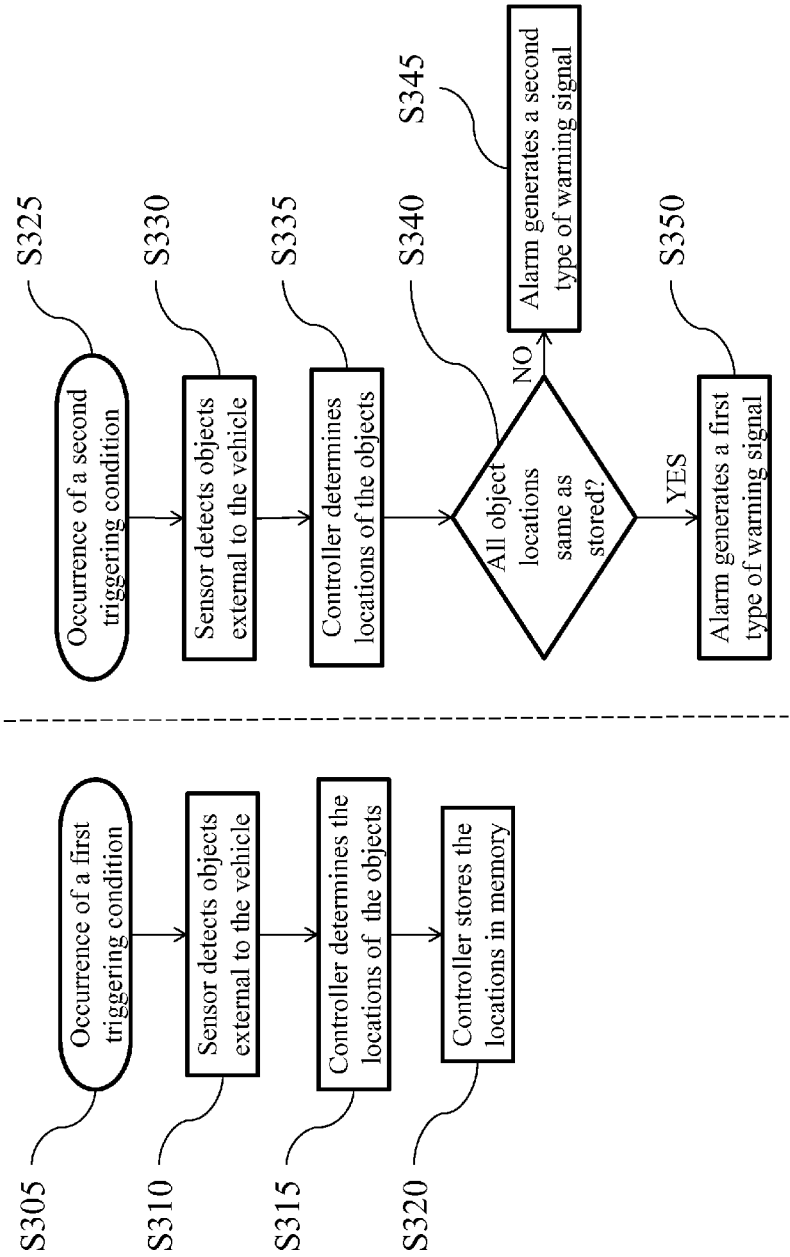

OBJECT DIFFERENTIATION WARNING SYSTEM

BACKGROUND

The present invention relates to systems and methods for alerting a driver of a motor vehicle to the presence of objects around the vehicle.

Many current motor vehicles are equipped with a safety system designed to alert the driver as to the presence of objects in the vehicle's path. Many of these systems provide visual and/or auditory based warnings to the driver. Some systems provide a single auditory warning tone for all detected objects. Other systems provide one auditory warning tone for objects detected in front of the vehicle and a second auditory warning tone for objects detected behind the vehicle to help the driver locate the detected objects. Other systems (U.S. 2003/0108212), further aid the driver in locating objects around the vehicle by emitting an auditory warning in the speaker located nearest to the sensor that detected the object.

SUMMARY

When an object warning system in a motor vehicle warns a driver about the presence of objects in the vehicle's path, the driver may disregard the warning if they believe that all the objects are expected. However, the unexpected object may be in the vehicle's path. The invention provides, amongst other things, a system and method for differentiating between and providing different types of warning for expected and unexpected objects.

In one embodiment, the invention provides a vehicle object warning system that differentiates between expected and unexpected objects. A sensor detects a set of objects external to the vehicle upon the occurrence of different triggering conditions. A controller determines locations of the sets of objects detected by the sensor. Further, the controller can store the locations of a set of objects in a memory as well as determine if the location of an object is not stored in the memory. An alarm provides a different type of warning if the controller determines that the location of an object is not stored in the memory.

In another embodiment the invention provides a method of operating a vehicle object warning system that differentiates between expected and unexpected objects. When a first triggering condition occurs, a first set of objects external to a vehicle are detected by a sensor. The locations of the first set of objects are determined by a controller and stored in a memory. When a second triggering condition occurs, a second set of objects are detected by the sensor. The locations of the second set of objects are determined the by the controller. The controller then compares the locations of the second set of objects to the locations stored in the memory. A first type of warning signal is generating by an alarm if all of the locations of the second set of objects are stored in the memory. A second type of warning signal is generated by the alarm is any of the locations of the second set of objects is not stored in the memory.

Other aspects of the invention will become apparent by consideration of the detailed description and accompanying drawings.

BRIEF DESCRIPTION OF THE DRAWINGS

FIG. 2A is an explanatory diagram of a first scenario, for the object differentiation warning system.

FIG. 3A is a flowchart of the operation of learning objects.

FIG. 3B is a flowchart of the operation of warning a driver of different types of objects.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
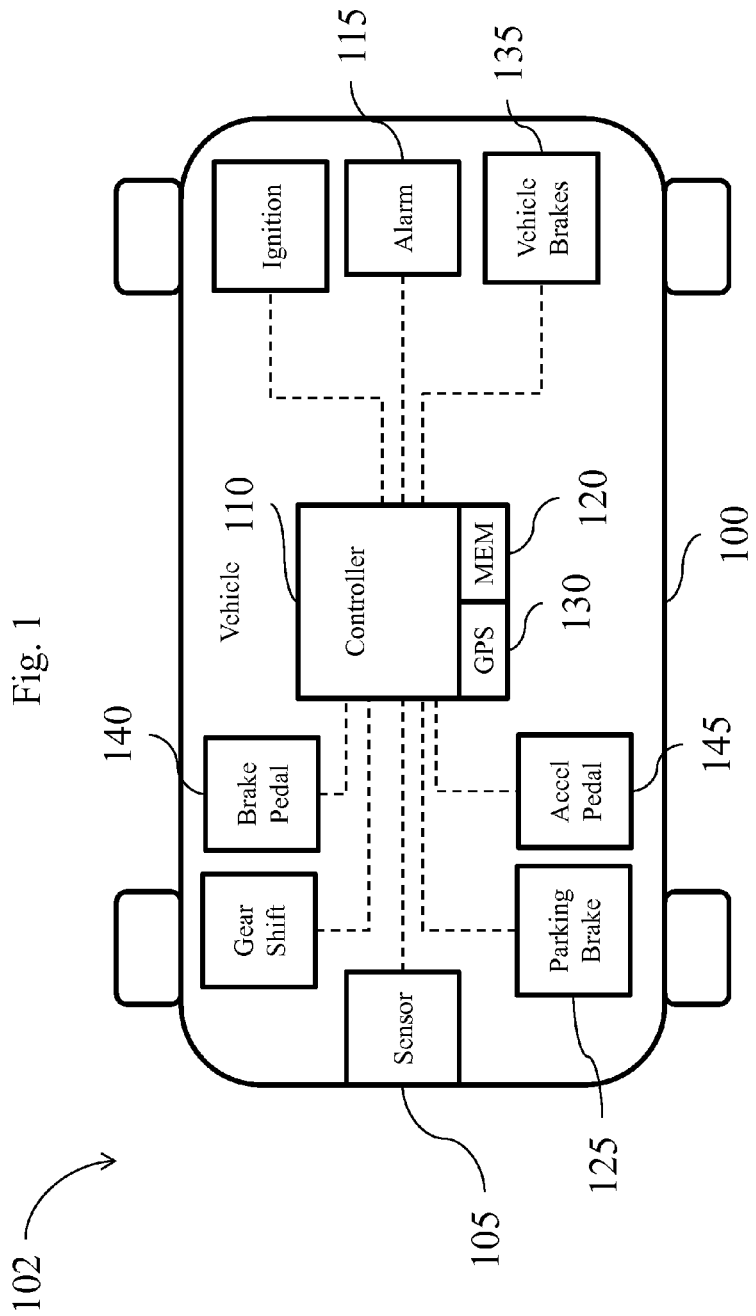
FIG. 1 is a block diagram of a vehicle equipped with an object differentiation warning system.

FIG. 1 illustrates a vehicle 100 equipped with the object differentiation warning system 102. The system 102 includes a sensor 105, a controller 110 having a memory 120, and an alarm 115. The sensor 105 is attached to the vehicle 100 and used for detecting the presence and location of one or more objects external to the vehicle 100. In the embodiment shown, the sensor 105 is a radar sensor, which emits pulses of radar waves. The emitted radar waves will bounce and reflect off of any objects in their path. The radar sensor receives the reflected radar waves and determines the location of a set of objects present in the effective range of the sensor. In the embodiment shown, a single sensor 105 is used. In other embodiments, multiple sensors are used (e.g., forward and reverse). The sensors may be any device that can detect objects external to the vehicle 100 including ultrasonic sensors, radar sensors, and/or optical sensors.

The sensor 105 is connected to the controller 110. This connection enables the controller 110 to receive signals indicative of the distance and direction of the set of objects from the vehicle 100. The controller 110 determines the locations of the set of objects and stores the locations in the memory 120 upon the occurrence of a trigger event. For example, the triggering event can occur when the vehicle 100 is put into park, when a parking brake 125 is engaged, or when the vehicle 100 is turned off.

When a second triggering event occurs (e.g., the vehicle 100 is subsequently turned on, the vehicle 100 is put reverse, etc.) the sensor 105 sweeps the area around the vehicle 100 within its effective range and detects a set of objects external to the vehicle 100. The controller 110 receives signals indicative of the distance and direction of the set of objects from the vehicle 100. The controller 110 determines the locations of the set of objects and compares the locations of the set of objects stored in the memory 120 with the locations of the set of objects currently around the vehicle 100. If the location of every object, detected by the sensor 105, matches with the locations stored in the memory 120 as a result of the first triggering event, the controller 110 transmits a first type signal to the alarm 115. Upon, receipt of the first type signal, the alarm 115 alerts the driver to the presence of objects around the vehicle 100 that were present at the time of the first triggering event. This alert can be an audible tone, a light, a haptic signal, etc. If the location of any object, detected by the sensor 105, does not match with the locations stored in the memory 120 as a result of the first triggering event, the controller 110 transmits a second type signal to the alarm 115. Upon receipt of the second type signal, the alarm 115 alerts the driver to the presence of objects around the vehicle 100 that were not present during the time of the first triggering event. This alert is different than the first alert (e.g., an audible tone, a light, a haptic signal, etc.) By using two different alerts, the driver is alerted to objects that were not present at the time of the first triggering event.

In another embodiment, the sensor 105 determines the locations of a set of objects external to the vehicle 100 instead of the controller 110. The controller 110 receives signals indicative of the locations of the set of objects.

Figure 2B:
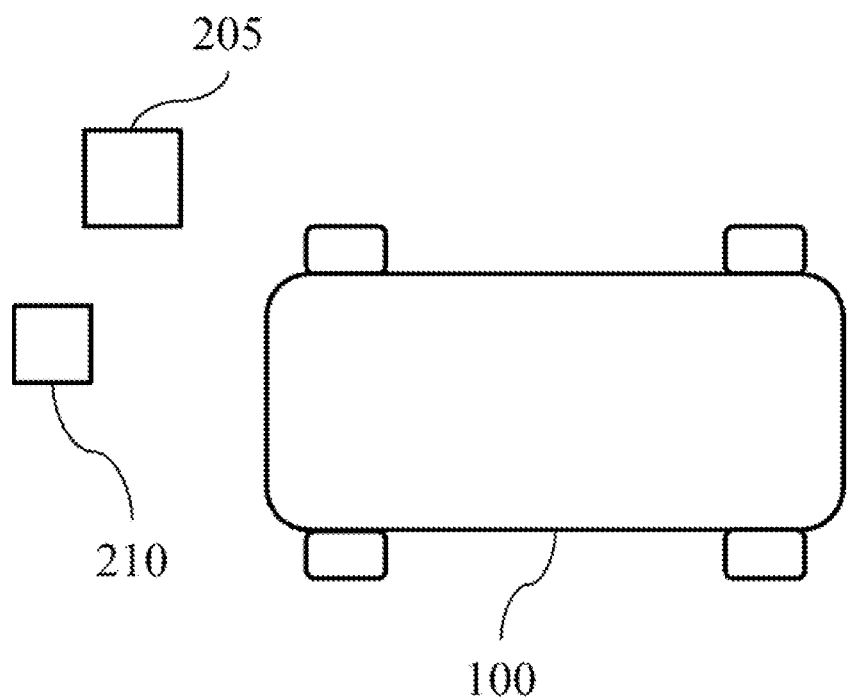
FIG. 2B is an explanatory diagram for a second scenario, for the object differentiation warning system.

FIGS. 2A and 2B represent example scenarios of the operation of the invention. FIG. 2A shows a vehicle 100 parked in a garage having an object, for example a pillar 205, located in close proximity to the rear the vehicle 100. When the vehicle is turned off the sensor 105 does a sweep around the vehicle 100 and detects the pillar 205 and sends a signal to the controller 110 representative of the location of the pillar 205. That signal is stored in memory 120 by the controller 110.

In the first scenario shown in FIG. 2A, when the driver subsequently turns on the vehicle 100, the sensor 105 does a sweep around the vehicle 100. As the pillar 205 is the only external object present, the sensor 105 detects only the pillar 205 and sends a signal to the controller 110 representative of the location of the pillar 205. The controller compares the location of the pillar 205, received from the sensor 105, with the location stored in the memory. As the two locations match, the controller 110 determines that the pillar 205 is the only object around the vehicle 100 and is the same pillar 205 as detected when the vehicle was turned off. As it is the same, the controller 100 sends a first signal to the alarm 115. Upon receipt of the signal, the alarm 115 emits an alert (e.g., a beep sound) to the driver that only "expected" objects are located around the vehicle 100.

In the second scenario shown in FIG. 2B, the driver turns on the vehicle 100 and the sensor 105 does a sweep around the vehicle 100. However, while the vehicle was off, a second object external to the vehicle 100, such as a bicycle 210, is placed behind the vehicle 100. In this scenario, the sensor 105 determines the location of the pillar 205 and the bicycle 210 and sends an indication of the two locations to the controller 110. The controller 110 compares the location of the two objects with the location stored in the memory 120. The controller 100 determines that a new object, not present when the vehicle 100 was turned off, is now present. The controller 110 then emits a second signal to the alarm 115 which emits a second alert (e.g., a chime). This second alert alerts the driver of the vehicle 100 to the fact that at least one "unexpected" object is around the vehicle 100.

FIGS. 3A and 3B illustrate an embodiment of the operation of the vehicle object warning system as shown in FIG. 1. First, the system 102 waits for a first triggering event to occur (e.g., the driver shifting the vehicle 100 into park) (S305). Upon occurrence of the first triggering event, the sensor 105 detects a first set of objects external to the vehicle (S310). It is to be understood that the sensor is capable of detecting more than one object external to the vehicle 100. Next, the controller 110 determines relative locations of the objects of the first set of objects to the vehicle 100 (S315). The controller 110 stores the locations for each object of the first set of objects in a memory 120 (S320).

The system 102 then waits for a second triggering event to occur (e.g., the driver shifting the vehicle 100 into reverse) (S325). Upon occurrence of the second triggering event, the sensor detects a second set of objects external to the vehicle 100 (S330). Next, the controller 110 determines relative locations of the objects of the second set of objects to the vehicle 100 (S335). The controller 110 compares the locations of the second set of objects to the locations stored in the memory 120 (S340). If all of the locations of the second set of objects are the same as the locations stored in the memory 120, an alarm is triggered which generates a first type of warning signal (S350). The first type of warning signal alerts the driver that objects are currently present around the vehicle 100 and that these objects were present when the first triggering condition occurred.

On the other hand, if the location of at least one object in the second set of objects is not stored in the memory 120, the alarm is triggered which generates a second type of warning signal (S345). The second type of warning signal alerts the driver that objects are currently around the vehicle 100 and that at least one of the objects was not present when the first triggering condition occurred.

In one embodiment, the system 102 includes a global positioning system 130 (GPS) in the vehicle 100. The GPS 130 allows the system 102 to determine the current location of the vehicle 100 using information received from satellites. The driver sets driver-specific locations in the system 102, such as a garage. The system 102 is configured to recognize when the vehicle 100 is located in a driver-specific location. In some embodiments, the system 102 operates only when the vehicle 100 is parked in a driver-specific recognized location. Additionally, the system 102 is configured to store the locations of objects in driver-specific locations without scanning the locations each time the vehicle 102 is turned off. For example, a driver sets his or her garage as a driver-specific location and the system 102 detects and stores in the memory 120 the locations of objects in the garage. Until the driver clears the garage as a driver-specific location, the vehicle 100 will not store the location of any additional objects in the garage. When the vehicle 100 is turned on and the system 102 recognizes that the vehicle 100 is located in the garage, the system 102 uses the locations of objects stored in memory 120 for the garage. In some embodiments, the system 102 stores a set of objects for a plurality of recognized locations (e.g., a home garage and a work parking structure).

In one embodiment, the alert for an unexpected object, generated by the system 102, may include one or more autonomous actions (e.g., applying the vehicle brakes 135, shifting the vehicle into park, etc. . . . ). In some embodiments, the system 102 requires a driver input (e.g., pressing the brake pedal 140, pressing the accelerator pedal 145, etc. . . . ) to override the autonomous action. For example, the system 102 generates an alert for an unexpected object and the system 102 automatically applies the vehicle brakes 135. To release the vehicle brakes 135, the driver must tap the brake pedal 140.

As used above, the term "set" is defined as zero or more.

As used above, the term controller may refer to, be part of, or include an Application Specific Integrating Circuit (ASIC); an electronic circuit; a combinational logic circuit; a field programmable gate array (FPGA); a processor (shared, dedicated, or group) that executes code; other suitable components that provide the described functionality; a combination of some or all the above, such as in a system-on-chip. The term module includes memory (shared, dedicated, or group) that stores executable instructions executed by the processor.

Thus, the invention provides, among other things, a system and method for alerting a driver to the presence of objects located around a vehicle. Various features and advantages of the invention are set forth in the following claims.

What is claimed is:

1. A vehicle object warning system that differentiates between expected and unexpected objects, the system comprising:

a sensor configured to detect a first set of objects external to a vehicle upon the occurrence of a first triggering condition, and detect a second set of objects external to the vehicle upon the occurrence of a second triggering condition; and a controller configured to
receive an indication of the first set of objects from the sensor,
determine locations of the objects of the first set of objects,
store the locations in a memory,
receive an indication of the second set of objects from the sensor,
determine locations of the objects of the second set of objects, and
compare the locations of the second set of objects with the locations stored in the memory; and an alarm configured to
generate a first warning when all of the locations of the second set of objects are stored in the memory, and
generate a second warning different from the first warning when at least one of the locations of the second set of objects is not stored in the memory.

2. The system of claim 1, wherein the sensor is configured to determine the locations of the first set of objects.

3. The system of claim 1, wherein the sensor is configured to determine the locations of the second set of objects.

4. The system of claim 1, wherein the alarm is an audio system.

5. The system of claim 4, wherein the first warning includes a first audible tone.

6. The system of claim 4, wherein the second warning includes a second audible tone.

7. The system of claim 1, wherein the first triggering condition occurs when a gear shift of the vehicle is shifted into park or a parking brake of the vehicle is engaged.

8. The system of claim 1, wherein the first triggering condition occurs when an ignition of the vehicle is turned off.

9. The system of claim 1, wherein the second triggering condition occurs when a gear shift of the vehicle is shifted into reverse.

10. The system of claim 1, wherein the second triggering condition occurs when an ignition of the vehicle is turned on.

11. The system of claim 1, wherein the sensor is at least one of a radar sensor, an ultrasonic sensor, and an optical sensor.

12. The system of claim 1, wherein the controller includes a GPS.

13. A method of operating a vehicle object warning system that differentiates between expected and unexpected objects, the method comprising:
detecting, by a sensor, a first set of objects external to a vehicle upon the occurrence of a first triggering condition;
determining, by a controller, locations of the objects of the first set of objects;
storing, by the controller, the locations of the first set of objects in a memory;
detecting, by the sensor, a second set of objects external to the vehicle upon the occurrence of a second triggering condition;
determining, by the controller, locations of the objects of the second set of objects;
comparing, by the controller, the locations of the second set of objects with the locations stored in the memory;
generating, by an alarm, a first warning signal if all of the locations of the second set of objects are stored in the memory; and
generating, by the alarm, a second warning signal if at least one of the locations of the second set of objects is not stored in the memory.

14. The method of claim 13, wherein the sensor determines the locations of the first set of objects.

15. The method of claim 13, wherein the sensor determines the locations of the second set of objects.

16. The method of claim 13, wherein the alarm is an audio system.

17. The method of claim 13, wherein the sensor is a radar sensor.

18. The method of claim 13, wherein the second warning signal includes an autonomous action performed by the vehicle.

19. The method of claim 18, wherein a driver input is required to override the autonomous action.

20. The method of claim 13, wherein a location of the vehicle is determined by a GPS.

* * * * *